United States Patent
Yamazaki

(10) Patent No.: US 8,032,286 B2
(45) Date of Patent: Oct. 4, 2011

(54) IRRADIATING DIRECTION CONTROL SYSTEM FOR A VEHICLE LAMP

(75) Inventor: Masashi Yamazaki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 428 days.

(21) Appl. No.: 12/369,023

(22) Filed: Feb. 11, 2009

(65) Prior Publication Data

US 2009/0204298 A1    Aug. 13, 2009

(30) Foreign Application Priority Data

Feb. 13, 2008   (JP) ................... 2008-031313

(51) Int. Cl.
  *B60Q 1/08*  (2006.01)
  *G02B 26/08*  (2006.01)
  *G06F 19/00*  (2006.01)
(52) U.S. Cl. ............. 701/49; 701/34; 362/466
(58) Field of Classification Search ........... 701/49, 701/34, 1; 362/466, 464, 37, 43, 514; 340/990
  See application file for complete search history.

(56) References Cited

U.S. PATENT DOCUMENTS

| | | | |
|---|---|---|---|
| 7,810,970 B2 * | 10/2010 | Ishiguro | 362/466 |
| 2002/0057572 A1 | 5/2002 | Kondo et al. | |
| 2005/0083702 A1 * | 4/2005 | Nishimura | 362/464 |
| 2007/0052555 A1 * | 3/2007 | Ibrahim | 340/990 |
| 2008/0262681 A1 * | 10/2008 | Morishita et al. | 701/49 |

FOREIGN PATENT DOCUMENTS

JP  2005-132340  5/2005

* cited by examiner

Primary Examiner — Tan Q Nguyen
(74) Attorney, Agent, or Firm — Fish & Richardson P.C.

(57) ABSTRACT

A system for controlling an irradiating direction of a vehicle lamp includes a target swivel angle calculating section to calculate a target swivel angle based on a vehicle steering angle, a swivel driver to execute, based on the target swivel angle, a swivel control to swivel the irradiating direction, and a fail-safe controller to execute, upon detection of a failure in the system, a fail-safe operation to stop the swivel control. When the system is restored after the failure, the fail-safe controller determines whether the target swivel angle is within a straight-ahead range that includes an angle corresponding to a straight-ahead direction of a vehicle. If the fail-safe controller determines that the target swivel angle is within the straight-ahead range, the fail-safe controller deactivates the fail-safe operation to restart the swivel control.

4 Claims, 4 Drawing Sheets

IRRADIATING DIRECTION CONTROL SYSTEM FOR A VEHICLE LAMP

CROSS-REFERENCE TO RELATED APPLICATION(S)

This application claims the benefit of priority of Japanese Patent Application No. 2008-031313, filed on Feb. 13, 2008. The disclosure of that application is incorporated herein by reference.

TECHNICAL FIELD

The present disclosure relates to a system which executes swivel control of an irradiating direction of a vehicle lamp, such as a headlamp or a supplementary lamp of an automobile, to change the irradiating direction of the vehicle lamp in right and left directions so as to follow a steering operation of the vehicle. The disclosure also describes a system which can smoothly restart the swivel control when the system is restored after a failure.

BACKGROUND

To improve driving safety of a vehicle, there has been proposed a vehicle lamp irradiating direction control system which executes swivel control to swivel the irradiating direction a headlamp so as to follow the steering direction. In such a system, in case of a system failure, the irradiating direction of the headlamp may be controlled to be directed in a direction different from the steering direction, whereby driving safety may deteriorate. Thus, to prevent such a problematic situation, there has been proposed a fail-safe technology for stopping the swivel control upon detection of a system failure. For example, a particular fail-safe technology fixes the irradiating direction of a headlamp in a straight-ahead direction of a vehicle when there is a system failure (see. e.g., Japan Patent Document No. JP 2005-132340 A). Further, a technique has been proposed for preventing the irradiating direction of the headlamp from being immediately directed in the steering direction when the system is restored after a failure. That is, when the system is restored during a rightward or leftward steering operation, the irradiating direction is abruptly changed from the straight-ahead direction to the rightward or leftward direction of the steering operation. This can impair driving safety because the illuminating region immediately changes from the region viewed by the driver to another region. Therefore, to prevent such situation, the foregoing system holds off restarting the swivel control until the steering angle is directed straight-ahead.

In the foregoing system, a target swivel angle is obtained by filtering a detected steering angle, and swivel control is executed based on the target swivel angle. For example, if the irradiating direction is controlled to follow the steering angle when there is a small fluctuation of the steering angle because of a rough road surface while the vehicle is running at high speed, the driver may become annoyed. As this is undesirable in view of driving safety, the steering angle is filtered to dampen an angular fluctuation to calculate the target swivel angle, based on which the irradiating direction is controlled, whereby a small fluctuation of the irradiating direction is prevented. As the result of this filtering, there exists an angular difference on the time axis between the actual steering angle and the target swivel angle. Therefore, there is a situation in which the steering angle is in the straight-ahead range but the target swivel angle is not in the straight-ahead range. If the system is restored and the swivel control is restarted in this situation, the irradiating direction of the lamp is controlled to be directed in the target swivel angle which is not yet within the straight-ahead range. Therefore, the foregoing system cannot fully address the problem described above in connection with the restoration of the system.

The problem which remains unsolved in the foregoing system is described in more detail with reference to FIG. 4A and FIG. 4B. For example, when the steering angle changes as shown in FIG. 4A, the steering angle is filtered to calculate the target swivel angle as shown in FIG. 4B. The swivel control normally is executed based on the target swivel angle. However, as shown in FIG. 4B, when there is a system failure, the irradiating direction is controlled to be in the straight-ahead direction irrespective of the target swivel angle. When the system failure is corrected, i.e. restored, the fail-safe operation is maintained until the steering angle is directed in the straight-ahead range. That is, when the steering angle is directed in the straight-ahead range, the fail-safe operation is deactivated, and the swivel control is restarted. At this time, however, the target swivel angle is not yet within the straight-ahead range because of the filtering. Therefore, the irradiating direction is controlled to jump from the straight-ahead direction to the target swivel angle. That is, the illuminating region immediately changes from the region viewed by the driver to another region, which can result in a feeling of discomfort for the driver and can deteriorate driving safety.

SUMMARY

In some implementations, the present invention provides a vehicle lamp irradiating direction control system in which undesirable swivel control is prevented when restoring the system after a failure.

According to an aspect of the present invention, a system for controlling an irradiating direction of a vehicle lamp includes a target swivel angle calculating section to calculate a target swivel angle based on a vehicle steering angle. The system includes a swivel driver to execute, based on the target swivel angle, a swivel control to swivel the irradiating direction, and a fail-safe controller to execute, upon detection of a failure in the system, a fail-safe operation to stop the swivel control. When the system is restored after the failure, the fail-safe controller determines whether the target swivel angle is within a straight-ahead range that includes an angle corresponding to a straight-ahead direction of a vehicle. If the fail-safe controller determines that the target swivel angle is within the straight-ahead range, the fail-safe controller deactivates the fail-safe operation to restart the swivel control.

Other aspects and advantages of the invention will be apparent from the following description, the drawings and the claims.

DETAILED DESCRIPTION

Figure 1:
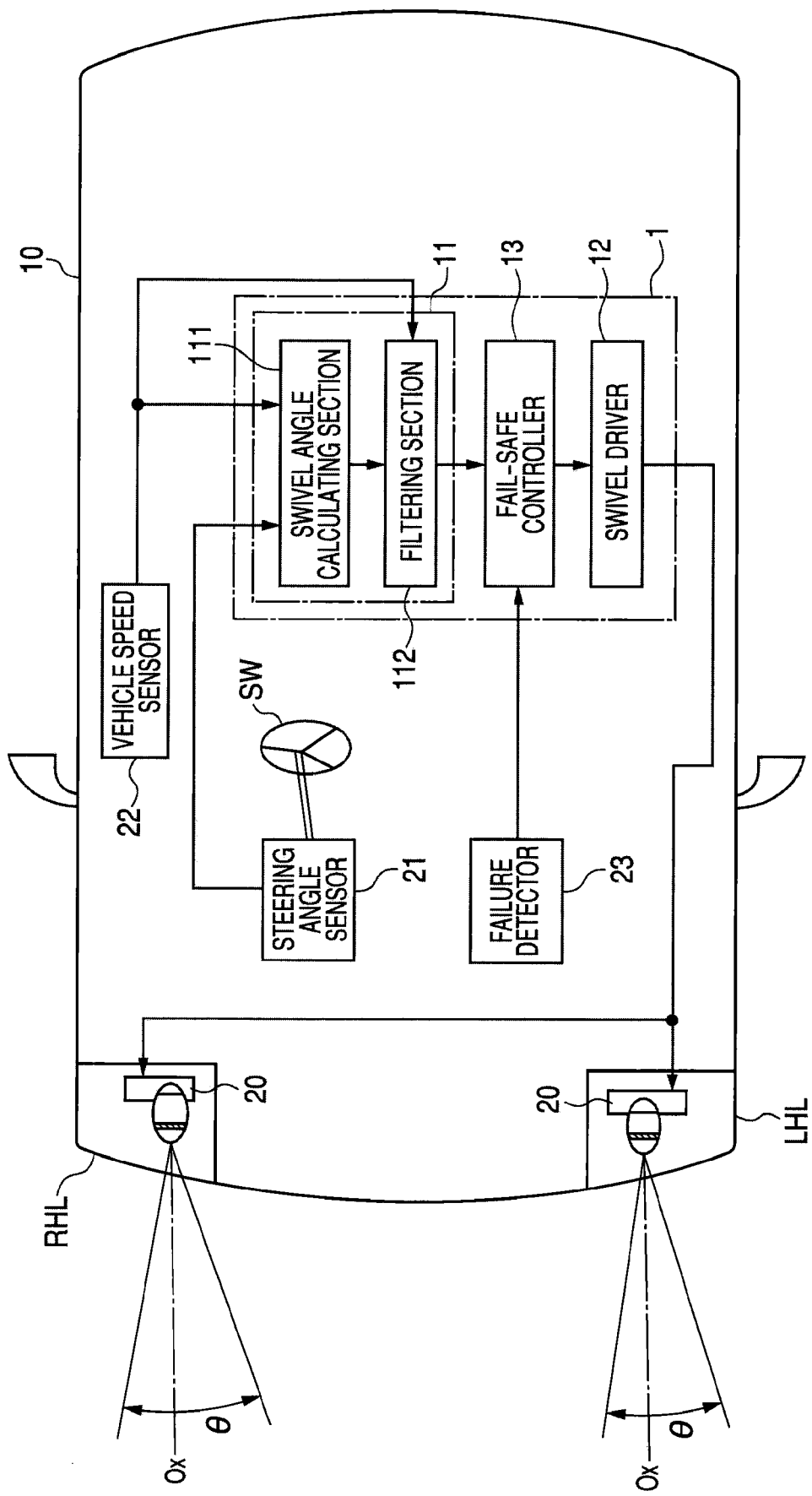
FIG. 1 is a block diagram illustrating a configuration of a system according to an embodiment of the present invention.

FIG. 1 is a schematic diagram illustrating an automobile to which a vehicle lamp irradiating direction control system according to an embodiment of the present invention is applied. As shown in the example of FIG. 1, headlamps RHL, LHL are provided on right and left sides of a front portion of a vehicle 10 to illuminate the forward region of the vehicle 10. Each of the headlamps RHL, LHL includes a swivel mechanism 20 which executes a swivel operation in right and left directions within a range of angle θ including a straight-ahead direction Ox of the vehicle 10. The vehicle 10 includes an ECU (Electronic Control Unit) 1 which controls the respective swivel mechanisms 20. The vehicle 10 further includes a steering angle sensor 21 and a vehicle speed sensor 22, which are coupled to the ECU 1. The steering angle sensor 21 detects a steering angle of a steering wheel SW operated by a driver, and the vehicle speed sensor 22 detects a speed of the vehicle 10.

The ECU 1 includes a target swivel angle calculating section 11 and a swivel driver 12. The target swivel angle calculating section 11 calculates a target swivel angle based on a steering angle signal from the steering angle sensor 21, and based on a vehicle speed signal from the vehicle speed sensor 22. The swivel driver 12 drives the swivel mechanisms 20 based on the target swivel angle calculated by the target swivel angle calculating section 11 to execute a swivel control of the headlamps RHL, LHL. The target swivel angle calculating section 11 includes a swivel angle calculating section 111 and a filtering section 112. The swivel angle calculating section 111 calculates a swivel angle based on the steering angle signal, and the filtering section 112 filters the swivel angle calculated by the swivel angle calculating section 111 and provides the target swivel angle as an output. The filtering section 112 changes its filter coefficient in accordance with a change in the vehicle speed to make the target swivel angle suitable for the vehicle speed. Although the swivel driver 12 normally controls the swivel mechanism 20 of each of the headlamps RHL, LHL to correspond to the target swivel angle, the swivel driver 12 controls, during a fail-safe mode, the swivel mechanism 20 to fix the irradiating direction to a straight-ahead direction.

Figure 2A:
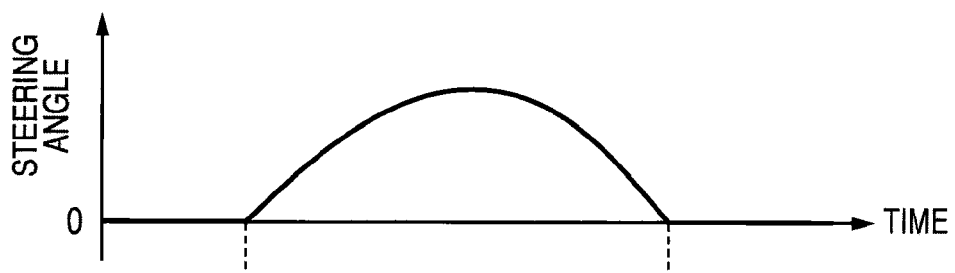
FIG. 2A to FIG. 2D are timing charts which illustrate a calculation of a target swivel angle.
Figure 2B:
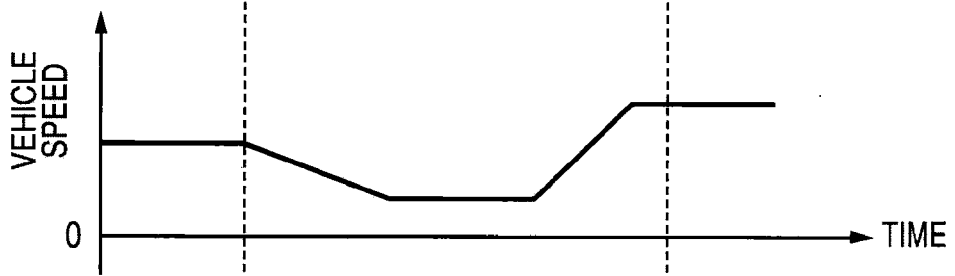
Figure 2C:
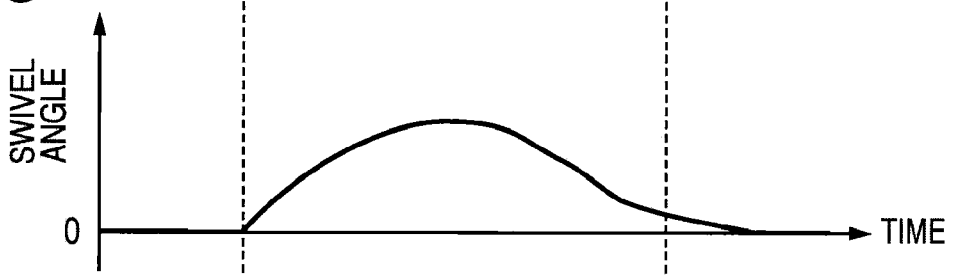
Figure 2D:
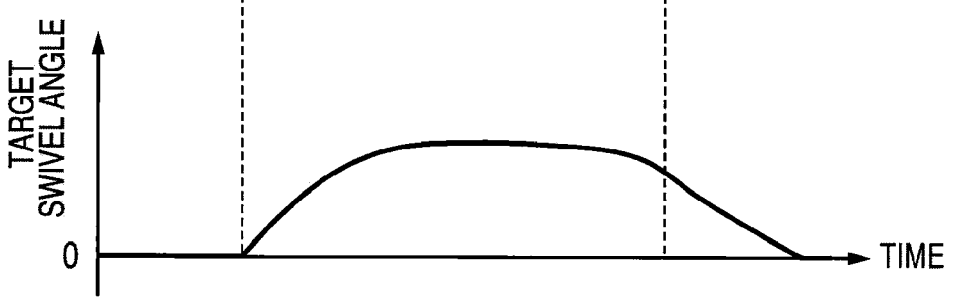

An example of calculating the target swivel angle in the target swivel angle calculating section 11 is as follows. When the steering wheel SW of the vehicle 10 is operated, for example as shown in FIG. 2A, the steering angle signal corresponding to the steering angle of the steering operation is sent from the steering angle sensor 21 to the swivel angle calculating section 111. Further, the vehicle speed signal corresponding to the vehicle speed is sent from the vehicle speed sensor 22 to the swivel angle calculating section 111. The vehicle speed during the steering operation may change as shown in FIG. 2B. Based on the steering angle and the vehicle speed, the swivel angle calculating section 111 calculates the swivel angle such that light irradiation from the headlamps RHL, LHL provides sufficient visibility for a driver in a direction in which the vehicle 10 is traveling. With regard to the calculation of the swivel angle, various algorithms can be implemented. In this embodiment, as shown in FIG. 2C, the swivel angle is calculated such that the irradiating direction is controlled to precede the steering direction slightly. The calculated swivel angle is then filtered through the filtering section 112 to obtain the target swivel angle. The filtering section 112 can include a variable delay circuit in which a delay time is set in accordance with a coefficient. Alternatively, the filtering section 112 can include a moving average circuit in which a moving average time is set in accordance with a coefficient. In the illustrated embodiment, the vehicle speed or a change of the vehicle speed (i.e., the acceleration) is referred to for changing the filtering effect. Specifically, when the vehicle is traveling at low speed or under low acceleration, a filtering coefficient is set to provide a low filtering effect so that the delay time or the moving average time is reduced, whereby the swivel angle is provided as a target swivel angle which substantially tracks the steering angle on the temporal axis. On the other hand, when the vehicle is traveling at high speed or under high acceleration, the filtering coefficient is set to provide a high filtering effect so that the delay time or the moving average time is increased, whereby the swivel angle is provided as a target swivel angle that is delayed on the temporal axis. In this manner, the target swivel angle as shown in FIG. 2D is obtained.

The vehicle 10 further includes a failure detector 23 which detects a failure of the system and includes the sensors 21, 22 and the headlamps RHL, LHL. A system failure to be detected by the failure detector may be an operation problem in the sensors 21, 22, the target swivel angle calculating section 11 or the swivel driver 12, or a connection problem in the wiring or a signal transmission failure between the components. The failure detector 23 can be configured to monitor voltage or current of the components that are required for normal operation of system, and to detect a failure when the voltage or the current deviates beyond a given range. A fail-safe controller 13 is provided between the target swivel angle calculating section 11 and the swivel driver 12. The fail-safe controller 13 receives a detection signal from the failure detector 23 when the failure detector 23 detects a system failure. Upon receipt of the detection signal, the fail-safe controller 13 executes a fail-safe control to substantially stop the swivel control in the swivel driver 12. Further, when the system is restored from the failure, the fail-safe controller 13 deactivates the fail-safe control based on the target swivel angle and causes the swivel driver 12 to resume the swivel control.

Figure 3:
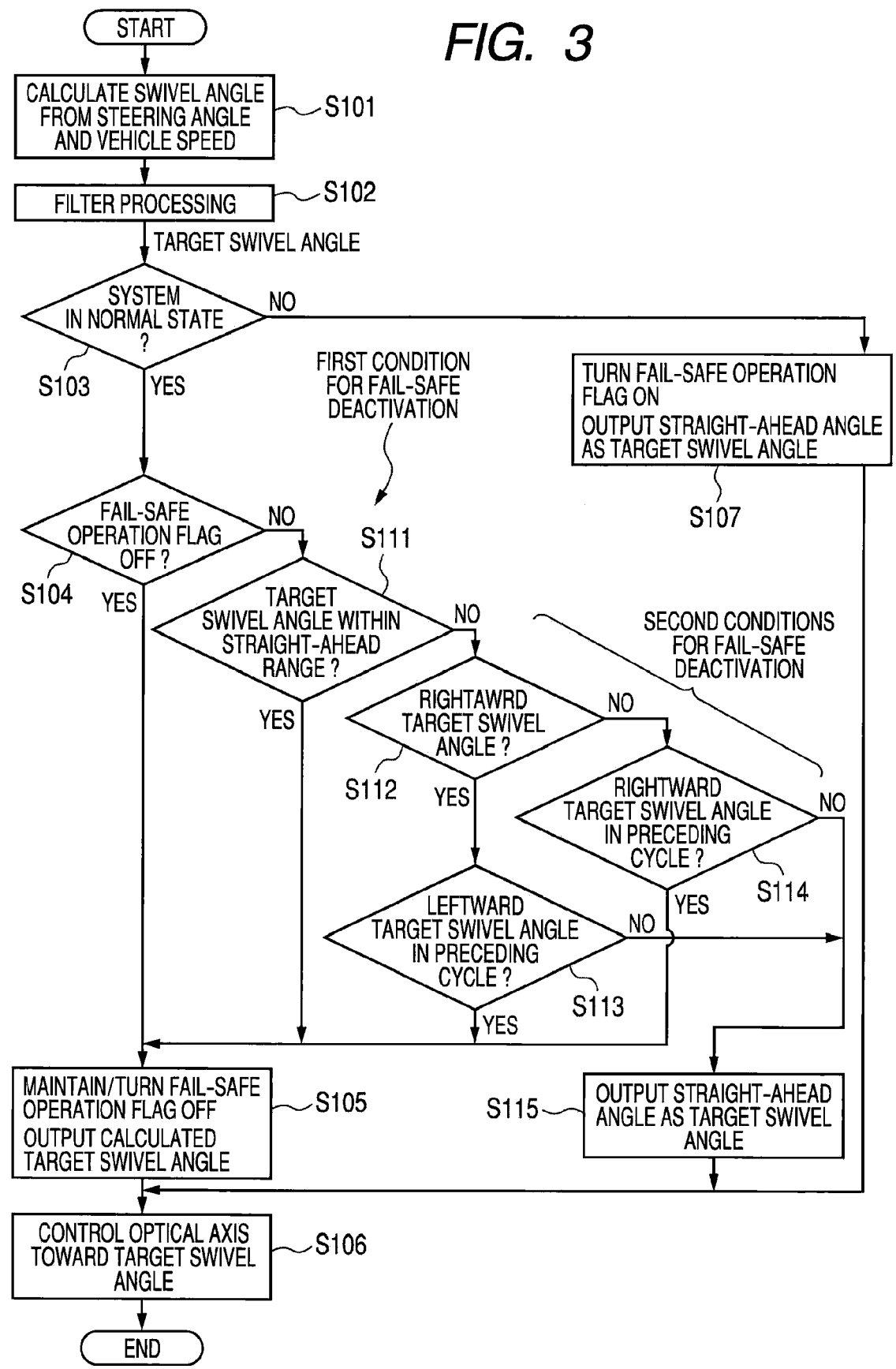
FIG. 3 is a flowchart of an operation of the system.

Next, operations in the irradiating direction control system having the configuration described above are described with reference to the flowchart of FIG. 3. The irradiating direction control system can start its operations when a headlamp switch is turned on after turning on an ignition switch of the vehicle 10. First, the ECU 1 acquires the steering angle signal and the vehicle speed signal from the steering angle sensor 21 and the vehicle speed sensor 22, and calculates, based on the steering angle and the vehicle speed, the swivel angle in the swivel angle calculating section 111 (S101). The swivel angle is a basic angle for controlling the irradiating direction of the headlamps RHL, LHL to follow the steering angle. The swivel angle is filtered through the filtering section 112, and the filtered swivel angle is provided as the target swivel angle (S102). In this filtering section 112, as described above, various operating conditions of the vehicle are estimated by referring to the vehicle speed from the vehicle speed sensor 22 or the acceleration calculated from the vehicle speed, and the filtering coefficient is changed to obtain the target swivel angle that is suitable for the operating condition of the vehicle.

Next, based on the detection signal from the failure detector 23, it is determined whether the system is in a normal state (S103). If it is determined that the system is in the normal state (S103: YES), it then is determined whether a fail-safe operation flag is OFF (S104). If it is determined that the fail-safe operation flag is OFF (i.e., when the fail-safe operation is not being executed), the fail-safe operation flag is maintained (i.e., the flag is remained OFF), and the swivel control of the headlamps are executed based on the target swivel angle as calculated (S105). Thus, the fail-safe controller 13 sets the swivel driver 12 to control the swivel mechanisms 20 based on the target swivel angle as calculated in Steps S101 and S102, and the swivel control is executed such that the irradiating direction of the headlamps RHL, LHL is directed at the target swivel angle (S106). Accordingly, when the system is in the normal state, the swivel control is executed in a normal manner.

On the other hand, if it is determined that the system is not in the normal state as a result of the detection signal from the failure detector 23 (i.e., if it is determined that there is a failure in the system (S103: NO)), the fail-safe controller 13 turns the fail-safe operation flag on, and immediately executes the fail-safe operation. In the fail-safe operation, the target swivel angle calculated by the target swivel angle calculating section 11 is ignored and instead, a straight-ahead angle directed toward the straight-ahead direction of the vehicle is provided as the target swivel angle to the swivel driver 12 (S107). Therefore, the swivel driver 12 controls the swivel mechanisms 20 to direct the irradiating direction of the headlamps RHL, LHL to the straight-ahead direction (S106). Accordingly, during the fail-safe mode, the irradiating direction of the headlamps RHL, LHL is fixed in the straight-ahead direction of the vehicle even when the target swivel angle is being calculated in accordance with changes in the steering angle and the vehicle speed, whereby the headlamps RHL, LHL are prevented from being controlled to irradiate light in undesirable directions.

When the system is restored after the failure, in the subsequent cycle, it is determined that the system is in the normal state (S103: YES), and thereafter, it is determined that the fail-safe operation flag in still ON (S104: NO) (i.e., the system is still under the fail-safe operation although the system is restored). In this case, it is determined whether a condition for deactivating the fail-safe operation is fulfilled. First, it is determined whether a first condition for deactivating the fail-safe operation is fulfilled. Specifically, the fail-safe controller 13 determines whether the target swivel angle calculated by the target swivel angle calculating section 11 in this cycle is within a straight ahead range (S111). This straight-ahead range is an angular range from a slightly rightward angle to a slightly leftward angle and includes a straight-ahead angle. The straight-ahead range is a range that can usually be ignored in the swivel control (i.e., a range in which the irradiating direction of the headlamps RHL, LHL need not be swiveled) because the vehicle 10 is driven substantially in the straight-ahead direction when the steering wheel SW is turned right or left within this angular range. If it is determined that the target swivel angle is within the straight-ahead range so that the first condition for deactivating the fail-safe operation is fulfilled (S111: YES), the procedure immediately goes to Step S105. In Step S105, the fail-safe operation flag is turned off, and the target swivel angle is output as calculated. Then, in Step S106, the irradiating direction of the headlamps RHL, LHL is controlled to be swiveled to the target swivel angle. That is, when the target swivel angle is within the straight-ahead range, the irradiating direction of the headlamps RHL, LHL is swiveled to be directed at the target swivel angle because the resulting illuminating region is substantially the same as the region viewed by the driver. Thus, driving safety can be maintained.

In Step 111, if it is determined that the first condition for deactivating the fail-safe operation is not fulfilled (i.e. if it is determined that the target swivel calculated in this cycle is not within the straight-ahead range (S111: NO)), it is then determined whether second conditions for deactivating the fail-safe-operation are fulfilled. As part of this determination, first it is determined whether the target swivel angle calculated in this cycle is a rightward target swivel angle with respect to the straight-ahead direction of the vehicle (S112). If it is determined that the target swivel angle calculated in this cycle is a rightward target swivel angle (S112: YES), it is then determined whether the target swivel angle that has been calculated in the preceding cycle is a leftward target swivel angle with respect to the straight-ahead direction of the vehicle (S113). If it is determined that the target swivel angle that has been calculated in the preceding cycle is a leftward target swivel angle (S113: YES), it is determined that the second conditions for deactivating the fail-safe operation is fulfilled, and the procedure immediately goes to Step S105. In Step S105, the fail-safe operation flag is turned off, and the target swivel angle is provided as calculated. Then, in Step S106, the irradiating direction of the headlamps RHL, LHL is controlled to be swiveled in the target swivel angle. That is, when the target swivel angle is changed from left to right, it can be determined that the steering direction of the vehicle 10 has just changed from left to right, and it can be assumed that the driver is looking in the direction close to the straight-ahead direction of the vehicle 10 or in the rightward direction toward which the steering wheel SW is operated. Thus, the rightward target swivel angle can be assumed to be the direction in which the driver is looking. Accordingly, the swivel control can be executed to control the irradiating direction of the headlamps RHL, LHL to be directed in the target swivel angle while ensuring safe driving.

In step S112, if the fail-safe controller 23 determines that the target swivel angle calculated in this cycle is not a rightward target swivel angle with respect to the straight-ahead direction of the vehicle (i.e., is a leftward target swivel angle (S112: NO)), it is then determined whether the target swivel angle calculated in the preceding cycle is a rightward target swivel angle with respect to the straight-ahead direction of the vehicle (S114). If it is determined that the target swivel angle calculated in the preceding cycle is a rightward target swivel angle (S114: YES), it is determined that the second conditions for deactivating the fail-safe operation is fulfilled, and the procedure immediately goes to step S105. In Step S105, the fail-safe operation flag is turned off, and the target swivel angle is provided as calculated. Then, in Step S106, the irradiating direction of the headlamps RHL, LHL is controlled to be swiveled in the target swivel angle. That is, when the target swivel angle is changed from right to left, it can be determined that the steering direction of the vehicle 10 has just changed from right to left, and it can be assumed that the driver is looking in the direction close to the straight-ahead direction of the vehicle 10 or in the leftward direction toward which the steering wheel SW is operated. Thus, the leftward target swivel angle can be assumed to be the direction in which the driver is looking. Accordingly, swivel control can be executed to control the irradiating direction of the headlamps RHL, LHL to be directed in the target swivel angle while ensuring the safe driving.

If it is determined that the target swivel angle calculated in the preceding cycle is a rightward target swivel angle in Step 113 (S113: NO), or if it is determined that the target swivel angle calculated in the preceding cycle is a leftward target swivel angle (S114: NO) (i.e. if it is determined that the target swivel angle remains as the rightward target swivel angle or the leftward target swivel angle), the steering direction cannot be estimated, and thus a direction in which the driver is looking cannot identified. Therefore, the fail-safe operation cannot be deactivated, and the fail-safe operation flag remains ON. In this case, the fail-safe controller 13 sets the straight-ahead direction of the vehicle as the target swivel angle (S115). Accordingly, the swivel driver 12 drives the swivel mechanisms 20 to control the irradiating direction of the headlamps RHL, LHL to be directed toward the straight-ahead direction of the vehicle (S106). That is, the fail-safe operation is continuously executed.

Figure 4A:
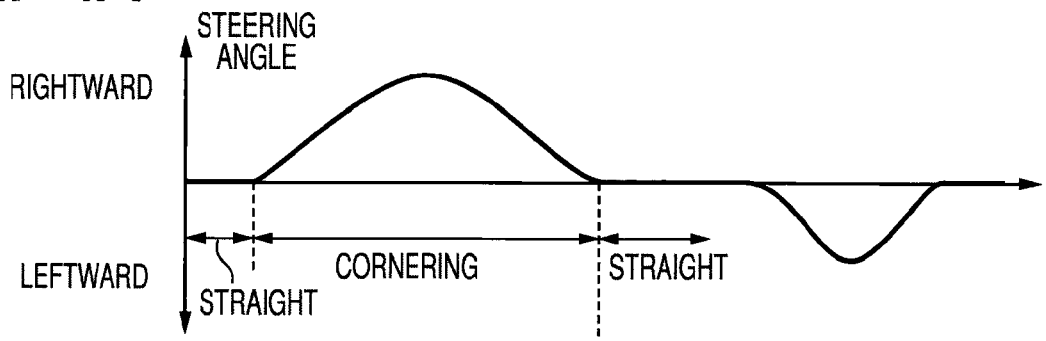
FIG. 4A to FIG. 4D are timing charts which illustrate effects according to the operation of the system.
Figure 4B:
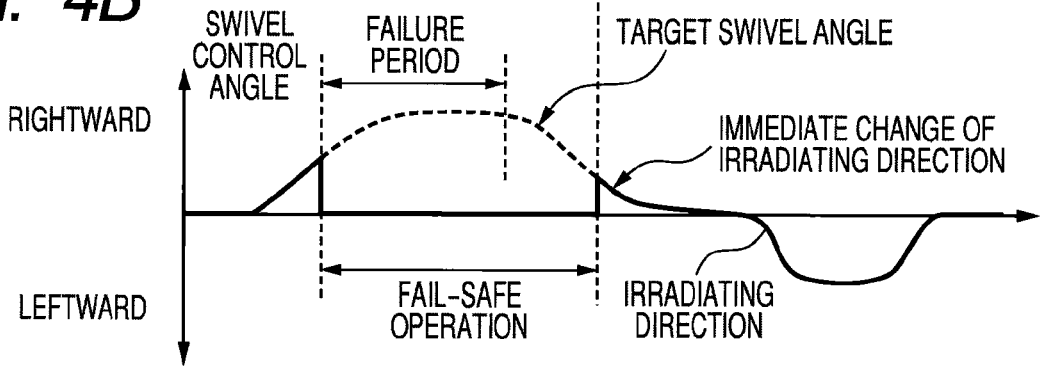
Figure 4C:
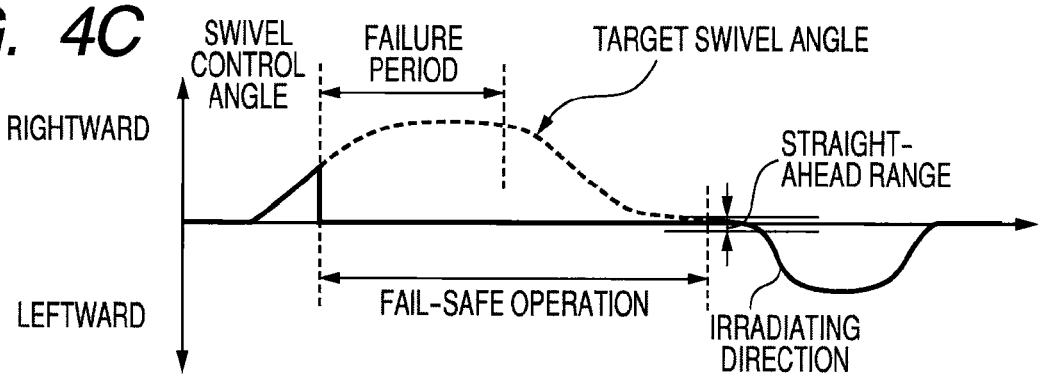

As described above, the fail-safe operation is not immediately deactivated when the system is restored after a failure, until the first or second conditions for deactivating the fail-safe operation are fulfilled. The first condition for deactivating the fail-safe operation occurs when the target swivel angle is within the straight-ahead range including the straight-ahead direction of the vehicle and slightly rightward and slightly leftward directions with respect to the straight-ahead direction. Thus, when the target swivel angle is within the straight-ahead range, the fail-safe mode is deactivated. FIG. 4C is a timing chart for swivel control according to the embodiment of the present invention in comparison with a previously known swivel control. As shown in FIG. 4C, even when the steering angle is directed straight-ahead (see FIG. 4A), the fail-safe operation is maintained until the target swivel angle, which is calculated through the filtering processing, falls within the straight-ahead range which is close to the straight-ahead direction. That is, when the target swivel angle enters the straight-ahead range, the fail-safe operation is deactivated. Therefore, when normal swivel control is restarted, the target swivel angle is close to the straight-ahead direction and, thus, the irradiating direction of the headlamps is directed in a direction close to the straight-ahead direction. Accordingly, this prevents the irradiating direction of the headlamps from jumping from the straight-ahead direction to which the irradiating direction has been fixed during the fail-safe operation.

Figure 4D:
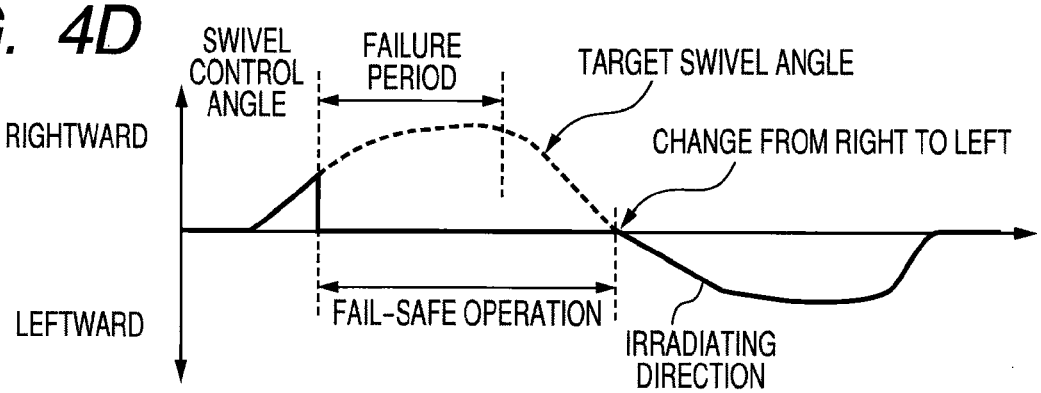

The fail-safe operation is also deactivated when second conditions for deactivating the fail-safe operation are fulfilled (i.e. when the target swivel angle is changed from left to right or from right to left including the straight-ahead direction of the vehicle therebetween). That is, when the target swivel angle is changed across the straight-ahead direction, the fail-safe operation is deactivated. FIG. 4D is a timing chart for swivel control according to the embodiment of the present invention that is executed during a steering operation which is slightly different from the steering operation illustrated in FIG. 4A. As shown in FIG. 4D, when the target swivel angle, which is calculated through the filtering processing, rapidly changes from right to left, the fail-safe mode is deactivated when the target swivel angle intersects the straight-ahead direction. Accordingly, normal swivel control is restarted based on the target swivel angle directed in the straight-ahead direction and, thus, the irradiating direction of the headlamps starts to move from the straight-ahead direction to which the irradiating direction has been fixed in the fail-safe operation. Therefore, unlike the example of FIG. 4B, the irradiating direction does not jump. The second conditions for deactivating the fail-safe operation are fulfilled when the target swivel angle is substantially in the straight-ahead direction and, thus, there may be a situation where the first condition for deactivating the fail-safe operation is also fulfilled. However, the second conditions for deactivating the fail-safe operation is effective especially in a case in which the target swivel angle is immediately changed, at the time of determining whether the first condition is fulfilled, across the straight-ahead range doe to a rapid steering operation.

According to the lamp irradiating direction control system described above, by setting the first and second conditions, the fail-safe operation is deactivated when a vehicle is traveling straight-ahead or when the traveling direction of the vehicle returns to the straight-ahead direction during a turning operation of the steering wheel from right to left or from left to right. Therefore, when normal swivel control is resumed, the irradiating direction of the headlamps is directed substantially in the straight-ahead direction of the vehicle. As a result, when swivel control is restarted, it helps prevent the driver from feeling discomfort as the result of a sudden change of the irradiating direction. Further, upon restarting swivel control, the region where the driver is looking is illuminated so that safe driving is maintained.

Although swivel control for vehicle headlamps has been described above, the present invention also is applicable to other types of lamps, e.g., a fog lamp, which illuminates a forward region of a vehicle. Moreover, a configuration of the filtering section for obtaining the target swivel angle is not limited to the particular details described above. Other filtering techniques are applicable.

Other implementations are within the scope of the claims.

What is claimed is:

1. A system for controlling an irradiating direction of a vehicle lamp, the system comprising:
    a target swivel angle calculating section arranged to calculate a target swivel angle based on a vehicle steering angle;
    a swivel driver arranged to execute, based on the target swivel angle, swivel control to swivel the irradiating direction; and
    a fail-safe controller arranged to execute, upon detection of a failure in the system, a fail-safe operation to stop the swivel control,
    wherein, the fail-safe controller is arranged so that, when the system is restored after the failure, the fail-safe controller determines whether the target swivel angle is within a straight-ahead range that includes an angle corresponding to a straight-ahead direction of a vehicle, and
    if the fail-safe controller determines that the target swivel angle is within the straight-ahead range, the fail-safe controller deactivates the fail-safe operation to restart the swivel control.

2. The system according to claim 1 wherein the system is arranged so that, if the fail-safe controller determines that the target swivel angle is within the straight-ahead range, the fail-safe controller further determines whether the target swivel angle has changed across the straight-ahead range, and
    if the fail-safe controller determines that the target swivel angle has changed across the straight-ahead range, the fail-safe controller deactivates the fail-safe operation to restart the swivel control.

3. The system according to claim 1 wherein the target swivel angle calculating section comprises:
    a swivel angle calculating section arranged to calculate a swivel angle based on the vehicle steering angle; and
    a filtering section arranged to filter, based on a vehicle speed, the swivel angle to obtain the target swivel angle.

4. The system according to claim 1 wherein the system is arranged so that, during the fail-safe operation, the irradiating direction of the vehicle lamp is fixed in the straight-ahead direction.

* * * * *